United States Patent Office 3,447,301
Patented June 3, 1969

3,447,301
TWINE
Keith L. Orser, Auburn, N.Y., assignor to Columbian Rope Company, Auburn, N.Y., a corporation of New York
No Drawing. Filed Sept. 30, 1964, Ser. No. 400,567
Int. Cl. D02g *3/04, 3/08*
U.S. Cl. 57—151         11 Claims

ABSTRACT OF THE DISCLOSURE

By using synthetic fibers having certain elongation characteristics at break in a quantity having a tensile strength of about half of the tensile strength of vegetable fibers and covered with paper, a twine is produced with an energy absorbing capability sufficient to withstand impact loads equal to the impact load limit of a vegetable fiber twine using enough fiber to have a much higher tensile strength. Thus, for example, instead of a baler twine having a normal tensile strength exceeding 300 pounds, the invention produces a baler twine having the same energy absorbing capability but with only enough fiber to provide a tensile strength of less than 175 pounds.

---

This invention concerns twine of the type used in automatic balers to secure bales of hay, straw and the like and particularly concerns a twine having energy absorption capabilities providing impact loading characteristics equal to or greater than those of conventional twines having much greater tensile strength.

Sisal twines used in hay balers normally have a static tensile strength of about 325 lbs. and a knotted length of sisal baler twine will break under a load of about 140 lbs. Some lighter weight twines are available but these are for smaller bales of hay and special applications; for convenience the baler twines referred to in this specification are standard baler twines in commercial use or the equivalent.

Development of synthetic fibers such as rayon, glass, nylon, polypropylene, and polyethylene, has resulted in efforts to produce a synthetic baler twine, but these efforts have so far been unsuccessful because the quantities of synthetic fibers to produce tensile and knot strengths comparable to sisal twines have been too expensive to be competitive. In addition, other difficulties have resulted from use of synthetic materials, such as unsatisfactory knots and melting or burning of the fibers in bale throwers.

For example, U.S. Patent No. 2,981,052, issued Apr. 25, 1961, on an application of Richard McHenry, discloses rayon fibers covered with paper to improve knotting characteristics with three bundles of fibers each totalling 8,800 denier making a total of 26,400 denier in the twine. Rayon having a tenacity of about 5 grams per denier would provide a tensile strength of about 300 lbs. and a baler knot break strength of about 180 lbs. These static characteristics are in the range of standard sisal baler twine. Knot break strength as used in the cordage industry is the tensile load at which a length of twine containing a knot physically breaks.

Sisal baler twine having a tensile strength of less than 325 lbs. is unsatisfactory; nevertheless I have discovered that certain combinations of synthetic fibers and paper, although of substantially lower strength, still satisfy normal use requirements of baler twine because of their disproportionately high ability to absorb energy upon impact loading. For example, a baler twine made of stretchable fibers such as rayon or linear polyethylene or polypropylene filaments or ribbons with a paper cover to improve knotting characteristics, may have a tensile strength of about half that of standard sisal baler twine, but still withstand the impact loadings to which the twine is subjected in the baling operation and the subsequent handling of the baled hay. Because these synthetic fibers will stretch, the energy absorption of a knotted length of twine is much greater than that of sisal twine having the same tensile strength. As a result my improved twine will withstand greater impact loads than sisal twine having the same tensile strength. Stretchable fibers, such as polypropylene filaments or ribbons are sufficiently elastic to recover in a short time almost all of the elongation resulting from normal loads.

Relying upon the energy absorption characteristics of elastic synthetic fibers and of the knots themselves when synthetic fibers are properly combined with paper, I have made baler twines of such fibers having a tensile strength between 145 and 170 lbs. which satisfactorily withstand the impact loads in the baling operation and the subsequent handling of baled hay.

EXAMPLE I

A satisfactory baler twine has been made of polypropylene fibers composed of monofilaments having a nominal denier between 150 and 200, formed into three bundles of about 4,000 denier each, and each covered by a strip of paper about 1¼" wide and weighing 16 lbs. per ream with the three covered bundles twisted together in conventional manner to form the twine. This twine contains slightly less than 35% polypropylene fiber and slightly more than 65% paper; it has an average tensile strength of about 170 lbs. and a length of the twine containing a baler knot will break under a load of about 115 lbs.

Even though the tensile strength of this twine is only a little over half the tensile strength of standard sisal baler twine, an 18" length of this twine containing a baler knot will withstand an impact load more than double the impact load limit of a similar knotted length of standard sisal baler twine. A 36" length of this polypropylene twine containing a baler knot will withstand an impact load about triple the impact load limit of a 36" length of standard sisal baler twine.

EXAMPLE II

Another twine with bundles of polypropylene fibers totalling 3,500 denier and made as Example I has a tensile strength of about 160 lbs., and a baler knot breaking strength of about 110 lbs. This twine contains about 30% polypropylene fiber and about 70% paper. Like Example I, an 18" length of this polyproplyene twine containing a baler knot will withstand an impact load about 90% greater than standard sisal baler twine and a 36" length of the twine will withstand an impact load about two and a half times the impact load limit of a comparable 36" length of knotted sisal baler twine.

EXAMPLE III

A twine constructed like Examples I and II but having only 3,000 denier per bundle of polypropylene fiber or a total of 9,000 denier has a tensile strength of about 145 lbs. and a knot breaking strength of about 94 lbs. This twine contains about 25% polypropylene fiber and 75% paper. An 18" length of this twine containing a baler knot will withstand an impact load about 70% greater than the impact load limit of an 18" length of standard sisal baler twine and a 36" length of this twine containing a baler knot will withstand an impact load about two and one-half times greater than a comparable 36" length of standard baler twine.

EXAMPLE IV

A twine having 3,000 denier of fiber of the same tenacity per bundle as in Example III, but with a paper cover 1½" wide and weighing 16 lbs. per ream has a tensile strength of about 145 lbs. and a knot breaking strength of about 105 lbs. This twine contains slightly more than 20% polypropylene fiber and slightly less than 80% paper. An 18" length containing a baler knot will withstand an impact load about 80% greater than an 18" length of standard sisal twine and a 36" length of this twine will withstand an impact load test about triple the impact load limit of a 36" length of knotted sisal standard baler twine.

While a baler twine must have a minimum tensile strength to withstand the high multiplication of forces resulting from friction in the baler mechanism and the friction between the twine and the hay being baled, failures more frequently occur as the result of high impact loads or a combination of frictional forces and impact loads. Hence, efficiency of a baler twine can best be measured by its resistance to impact loading.

Inasmuch as sisal is relatively non-stretchable, a very strong sisal twine is necessary in order to withstand the impact loadings in a hay baler or the impact loadings resulting from handling the baled hay. These latter loadings can result from throwing the bales by automatic balers onto wagons, suddenly lifting the baled hay by the twine, or by dropping the bale from 10 ft. to 20 ft. as it is removed from transporting vericles or storage areas.

All of the examples of polypropylene baler twines set forth above have an elongation of more than 5% and usually 7% to 10% when a knotted length breaks, and an elongation of more than 10% when a straight length is loaded to break. Compared to this, standard sisal baler twine has an elongation of 2% or less at knot break.

Field tests have established that baler twine made of synthetic fibers as described above, perform satisfactorily in baling, loading, and handling operations, and even withstand impact loads which would break sisal twine normally used.

I claim:

1. A baler twine comprising a plurality of elements twisted together, each element being composed of a bundle of synthetic elastic fibers surrounded by a paper cover, said twine having a tensile strength of less than 200 pounds and being sufficiently elastic to elongate at least 5% when a knotted length is loaded sufficient to break, the denier of the fibers in the twine totaling between 8,000 and 12,000 denier.

2. A baler twine comprising a plurality of elements twisted together in which each element is composed of a bundle of polypropylene fibers covered by a paper strip, the total of the polypropylene filaments in the twine approximating 9,000 denier.

3. A baler twine as defined in claim 2 wherein the polypropylene fibers are monofilaments having a nominal denier between 150 and 200.

4. A baler twine as defined in claim 2 wherein the paper covering is about 1¼" wide and weighs about 16 lbs. per ream.

5. A baler twine as defined in claim 3 wherein the paper covering is about 1¼" and weighs about 16 lbs. per ream.

6. A baler twine comprising a plurality of elements twisted together, each element being composed of a bundle of polypropylene fibers covered by a paper strip in which the polypropylene fibers in the twine total between 8,000 denier and 12,000 denier.

7. A baler twine composed of paper covered elastic synthetic fibers having an elongation of more than 5 percent when a knotted length breaks providing an energy absorbing capability adequate when knotted to withstand impact loads exceeding impact load limits of vegetable fiber twine which has more than 50 percent greater tensile strength, said elastic synthetic fibers comprising less than 35 percent and the paper covering comprising more than 65 percent of the weight of the twine.

8. A baler twine composed of paper covered elastic synthetic fibers having an elongation greater than 10 percent when a straight length is loaded to break and a tensile strength less than 175 pounds, providing an energy absorption capability sufficient to withstand an impact load on a knotted length greater than the impact load limit of an equal knotted length of sisal fiber twine which has a tensile strength exceeding 300 pounds, said elastic synthetic fibers comprising less than 35 percent and the paper covering comprising more than 65 percent of the weight of the twine.

9. A baler twine composed of paper covered elastic synthetic fibers having an elongation greater than 5 percent when a knotted length breaks and a knot break strength less than 110 pounds providing an energy absorption capability sufficient to withstand an impact load greater than the impact load limit of a sisal baler twine which has a baler knot strength exceeding 125 pounds, said elastic synthetic fibers comprising less than 35 percent and the paper covering comprising more than 65 percent of the weight of the twine.

10. A baler twine composed of paper covered elastic synthetic fibers having an elongation greater than 10 percent when a straight length is loaded to break, an elongation greater than 5 percent when a knotted length is loaded to break, a tensile strength less than 175 pounds and a baler knot strength less than 110 pounds providing an energy absorption capability adequate to withstand an impact load on a knotted length greater than the impact load limit of an equal knotted length of sisal baler twine which has a tensile strength exceeding 300 pounds and a baler knot strength exceeding 125 pounds, said elastic synthetic fibers comprising less than 35 percent and the paper covering comprising more than 65 percent of the weight of the twine.

11. A baler twine comprising a plurality of elements twisted together in which each element is composed of a bundle of polypropylene fibers covered by a paper strip, the total of the polypropylene filaments in the twine approximating 9,000 denier, the paper covering comprising more than 65 percent by weight of the twine.

References Cited

UNITED STATES PATENTS

| | | | |
|---|---|---|---|
| 2,832,190 | 4/1958 | Bacon | 57—151 |
| 2,981,052 | 4/1961 | MacHenry | 57—154 |
| 3,137,990 | 6/1964 | Carranza | 28—1 |
| 2,388,745 | 11/1945 | Katz | 57—155 |

DONALD E. WATKINS, *Primary Examiner.*